United States Patent [19]

Beretta

[11] Patent Number: 5,053,264

[45] Date of Patent: Oct. 1, 1991

[54] PLASTIC MATERIAL NET STRUCTURE

[75] Inventor: Mario Beretta, Sirtori, Italy

[73] Assignee: RDB Plastotecnica S.p.A., Vigano' Brianza, Italy

[21] Appl. No.: 450,499

[22] Filed: Dec. 14, 1989

[30] Foreign Application Priority Data

Dec. 20, 1988 [IT] Italy .................. 23021 A/88

[51] Int. Cl.$^5$ .................. B32B 3/10; B29C 55/00
[52] U.S. Cl. .................. 428/131; 428/134; 428/135; 428/255; 428/910; 428/136; 428/167; 428/156; 428/500; 264/DIG. 81
[58] Field of Search .............. 428/131, 134, 135, 255, 428/910, 136, 167, 156, 500; 264/DIG. 81

[56] References Cited

U.S. PATENT DOCUMENTS

| | | | |
|---|---|---|---|
| 3,697,347 | 10/1972 | Lehmann | 428/288 X |
| 4,059,713 | 11/1977 | Mercer | 428/910 X |
| 4,152,479 | 5/1979 | Larsen | 428/910 X |
| 4,201,814 | 5/1980 | Gilbert et al. | 428/910 X |
| 4,303,714 | 12/1981 | Mercer | 428/135 |
| 4,374,798 | 2/1983 | Mercer | 428/910 X |
| 4,536,429 | 8/1985 | Mercer | 428/910 X |
| 4,743,486 | 5/1988 | Mercer et al. | 428/910 X |
| 4,756,946 | 7/1988 | Mercer | 264/288.8 X |

Primary Examiner—Ellis P. Robinson
Assistant Examiner—William P. Watkins, III
Attorney, Agent, or Firm—Guido Modiano; Albert Josif

[57] ABSTRACT

The plastic material net structure, particularly useful for geotechnical applications, has a plurality of holes uniformly arranged in rows and columns. The sheet further comprises portions which are elongated in the stretch direction, are mutually separated by the holes and have a predominance of molecules orientated in the stretch direction. The elongated portions extend from node elements which have a plurality of non-orientated molecules. The node elements are mutually joined by non-oriented transverse portions which extend between said holes in a direction which is substantially perpendicular to the elongated portions. The node elements have a thickness which is greater than the thickness of the transverse portions and of the elongated portions.

5 Claims, 3 Drawing Sheets

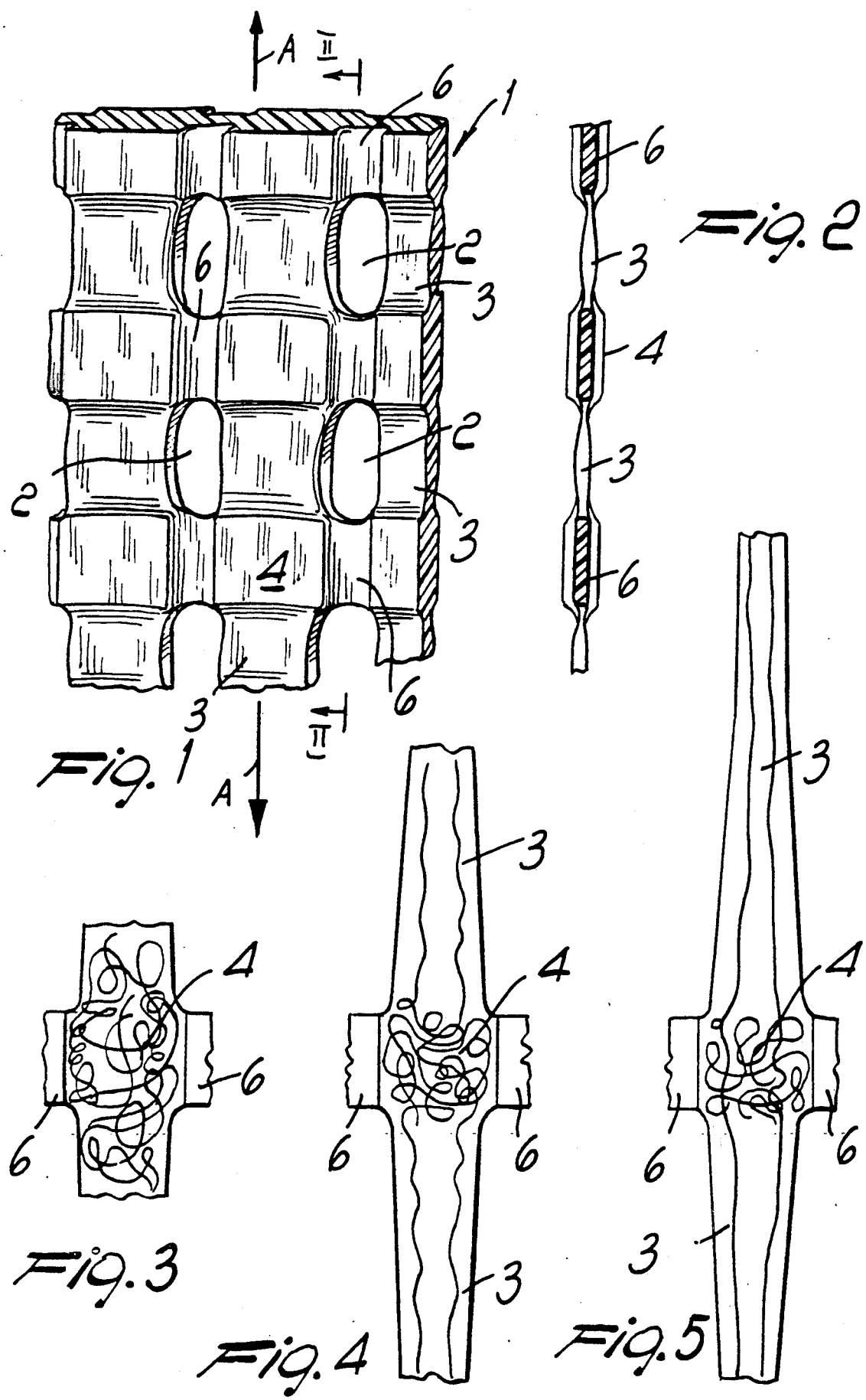

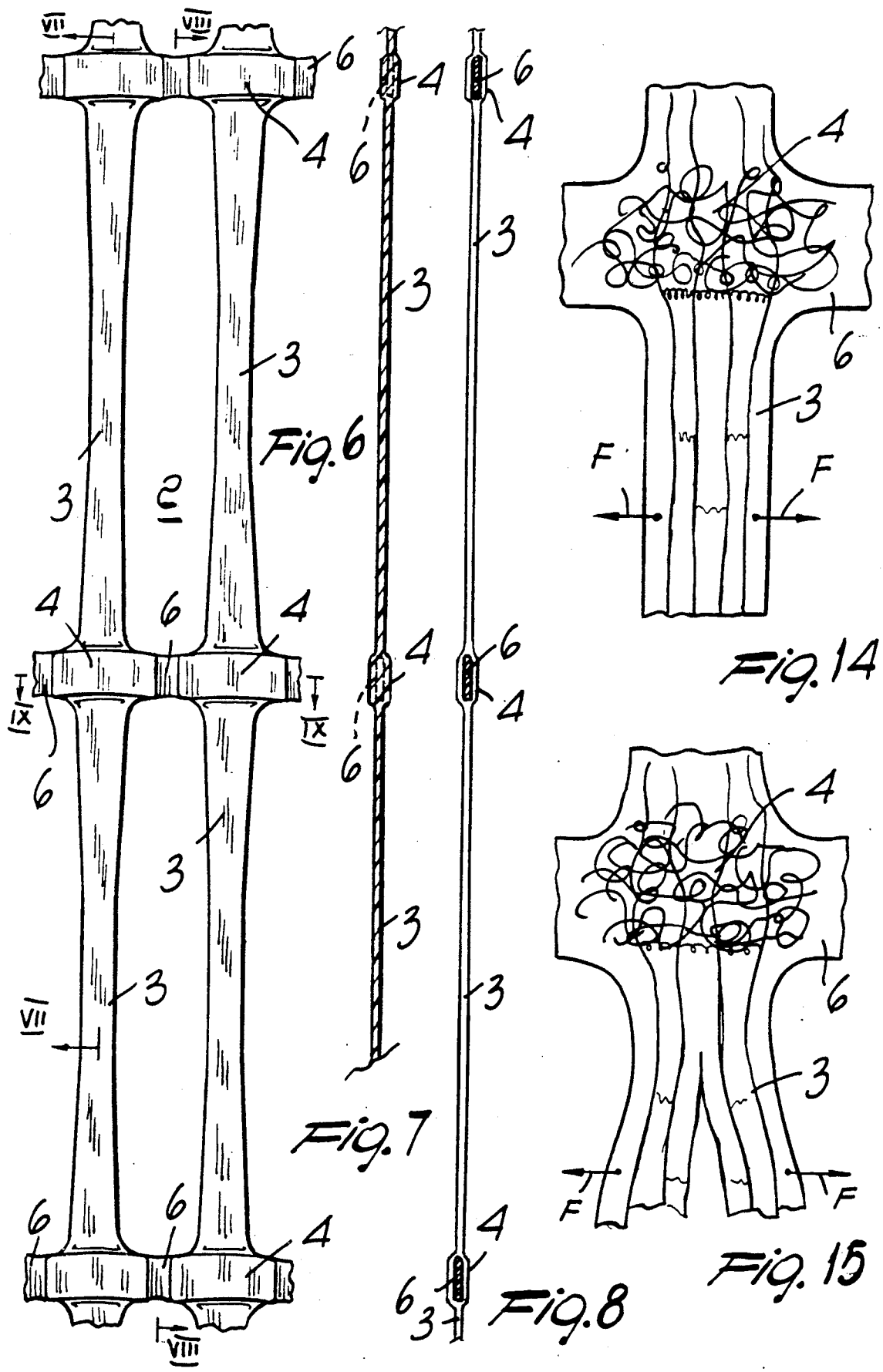

PLASTIC MATERIAL NET STRUCTURE

BACKGROUN OF THE INVENTION

The present invention relates to a plastic material net structure, which is particularly useful for geotechnical applications.

As is known, net structures with a substantially laminar structure, for example of the type described in the U.S. Pat. No. 4,470,942 and in the U.S. Pat. No. 4,756,946, are currently commercially available.

It is also known that, in the manufacture of net-like products the stretching process, by orientating the molecules, improves the product mechanical characteristics in the stretch direction, such as its ultimate tensile stress, its elongation, its modulus, its creep and the like.

It is also known in common practice that when a perforated sheet of uniform thickness is stretched in a preset direction it produces a net which has the typical characteristics of a product of this kind, i.e. transverse portions which are substantially unstretched and a continuous series of stretched longitudinal portions or threads which extend from points of said transverse portions which are commonly termed nodes.

For example, the U.S. Pat. No. 4,756,946 describes a stretched net obtained starting from a perforated sheet of constant thickness, so that, after stretching, a depression is obtained in the node region, i.e. a region which extends in the direction perpendicular to the laying plane of the net and has a reduced thickness with respect to the adjacent regions, which are in practice arranged on the transverse portions between the nodes.

Different geometrical arrangements can be obtained besides the above mentioned depressions; said arrangements depend directly on the manner in which the stretching is performed, such as for example the stretching temperature, the stretching speed, the characteristics of the polymer employed and stretch ratio.

All these parameters concur together to define the geometrical configuration of the final product, the shape whereof depends on the starting material, i.e. on the characteristics of the polymer, and on the methods used during production, as above indicated.

In particular, the final mechanical characteristics are mainly a function of the stretch ratio as well as of the kind of polymer and of the conditions under which it is processed.

A low stretch ratio produces a product with low toughness and high residual elongation, while an optimum stretch ratio provides a higher ultimate tensile stress and a limited residual elongation.

Besides the ultimate tensile stress, if the characteristics of the initial polymer are the same, the stretch ratio also drastically affects the creep and stress relaxation characteristics, which are extremely important in the use of plastic nets, especially in engineering fields.

A low stretch ratio in fact causes high creep and high stress relaxation, and both are negative characteristics for products to be subjected to constant loads such as nets for geotechnical applications.

It is therefore evident that the production of this kind of product is directed toward the use of high stretch ratios, which are the only ones that can ensure the required characteristics of the manufactured products.

Considering in particular the net which constitutes the subject of the U.S. Pat. No. 4,756,946, said net can be schematically described as a set of longitudinal stretched threads or portions which are joined to blocks of polymer which are arranged mutually aligned and are joined by transverse portions. Due to the movement of the macromolecules, the entire assembly tapers from a thicker point to a narrower point produced by the stretching process.

With reference to the internal structure of the elongated portions, the alignment of the stretched molecules is maximal, while in the region of connection to the transverse portions, i.e. in the nodes, even the molecules which constitute the node are substantially aligned with the elongated portions. In practice the node, too, is significantly stretched in the same stretch direction as the elongated portions, and this is why the node has a reduced thickness.

In the transverse portion regions which are comprised between two nodes, the molecules are unstretched, i.e. it can be said that they are entangled with one another, since no energy has been expended to produce their unnatural alignment.

With reference to the steps for the production of this kind of net, in the initial stage, before the stretching is performed, all the molecules are entangled in their best condition of low energy content, and the specimen thus obtained is elastic in all directions, both under flexure and under traction.

When a first stretching action is performed, the molecules begin to arrange themselves in an orderly manner; as they align, they tend to become parallel to one another, especially in the region of the elongated portions, so that the load which the specimen can withstand is increased with respect to the initial condition.

In the final stretching stage, the elongated portions have a considerably increased longitudinal extension and their cross section is reduced further, until its maximum transverse dimension is smaller than the transverse dimension of the initial product; the molecules are all mutually parallel in the elongated portions, and this mutual alignment also affects the region of the node.

The ultimate tensile stress is increased considerably with respect to the initial characteristics. However, in such conditions the high resistance to applied loads refers to the direction of the orientation.

The product furthermore has a low elastic-plastic elongation under traction in the direction of orientation and an extremely low resistance to loads applied orthogonally to said orientation.

The product furthermore has a very low resistance to flexure and to bending stress when the torque is applied transversely to the direction of orientation of the various fibers or molecules.

This can be explained by the fact that the forces which act in the direction of the fibers are contrasted by the fibers or molecules themselves, while the forces which act transversely work against intramolecular chemical and physical bonds and against the small number of transverse chemical bonds. The molecules consequently separate from one another and yield under the action of even reduced forces without causing mutual elongations.

Similarly, a flexing action obtained with a torque which is transverse to the stretch direction can easily cause a crack in the elongated portions; said cracking is not stopped at the various nodes, since the orientation of the molecules in the stretch direction is predominant in the nodes as well.

When flexure is applied to the net, the bending action furthermore concentrates in the regions of lower thickness, i.e. in the regions of the node, the fibers whereof are predominantly orientated in the stretch direction, with a consequent severe possibility of breakage at the node, while the transverse portions between the nodes, the fibers or molecules whereof are practically non-orientated and are therefore possibly capable of withstanding flexure, are not subject to said flexing actions.

SUMMARY OF THE INVENTION

The aim of the invention is indeed to eliminate the above described disadvantages by providing a net structure, wherein it is possible to avoid, at the nodes, the predominant orientation of all the fibers in the stretching direction, consequently avoiding possible cracking.

Within the above described aim, a particular object of the invention is to provide a net structure which can have improved characteristics of resistance—to breaking loads with initial raw materials, which does not allow the propagation of breakages in the stretching direction, and which furthermore has high resistance to flexure and to loads applied transversely to the stretch direction.

Another object of the present invention is to provide a net structure which is capable of giving the greatest assurances of reliability and safety in use by virtue of its particular implementation characteristics.

Not least object of the present invention is to provide a net structure which is simple to manufacture and has a modest cost.

This aim, the mentioned objects and others which will become apparent hereinafter are achieved by a net structure, as defined in the appended claims.

BRIEF DESCRIPTION OF DRAWINGS

The characteristics and advantages will become apparent from the description of a preferred but not exclusive embodiment of a net structure, particularly useful for geotechnical applications, illustrated only by way of non-limitative example in the accompanying drawings, wherein:

FIG. 1 is a schematic and partially sectional view of a portion of the initial sheet-like element;

FIG. 2 is a sectional view taken along the line II—II of FIG. 1;

FIG. 3 is a schematic view of the shape of the node, with the molecules indicated for the sake of clarity before stretching;

FIG. 4 is a schematic view of the arrangement of the molecules in the elongated portions after a first stretching step;

FIG. 5 is a schematic view of the orientation of the molecules in the elongated portions, after the stretching has been performed;

FIG. 6 is a schematic view of the net structure after the sheet-like element has been stretched in the direction of the elongated portions;

FIG. 7 is a sectional view taken along the line VII-VII of FIG. 6;

FIG. 8 is a sectional view taken along the line VIII-VIII of FIG. 6;

FIG. 14 is a schematic enlarged-scale view of the arrangement of the fibers or molecules in the elongated portions, with the intramolecular cohesion forces illustrated schematically;

FIG. 15 is a schematic view of the breakage which occurs in the elongated portions if they are subject to an action in a direction which is perpendicular to the stretch direction and is arranged on the plane of the monostretched sheet.

DESCRIPTION OF THE PREFERRED EMBODIMENTS

Figure 9:
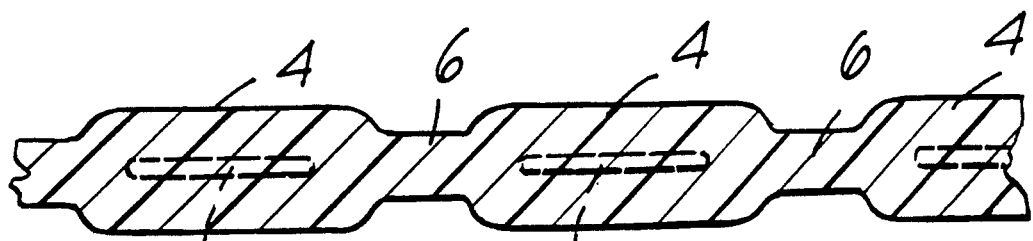
FIG. 9 is a sectional view taken along the line IX-IX of FIG. 6.
Figure 10:
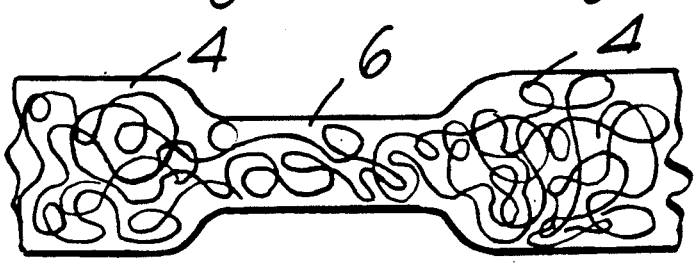
FIG. 10 is a schematic view of a transverse portion comprised between two nodes, with the arrangement of the molecules schematically illustrated.

With reference to the above described figures, the net structure, particularly useful for geotechnical applications, according to the invention, can be obtained from an initial sheet of plastic material, generally indicated by the reference numeral 1, in which a plurality of holes 2 is defined; said holes may have any shape and are uniformly distributed in rows and columns.

Regions 3 are defined between the holes 2 in the stretch direction, which is indicated by the arrows A in FIG. 1; said regions will constitute the elongated portions which extend from a node element 4 which is in practice arranged between four holes 2. The node element protrudes with respect to the thickness of the regions 3 and may have a variable configuration. Regions 6 are defined between the node elements 4 in the direction which is perpendicular to the stretch direction and will constitute the transverse portions.

In the preferred configuration, the regions 6 may have a pre-stretching in the direction of the transverse portions, i.e. in the direction which is substantially perpendicular to the regions which will define the elongated portions, with an elongation ratio of the fibers in the region 6 preferably comprised between 1 and 2.5. Said transverse pre-stretching may occur either in the semi-fluid state during the production of the sheet, whether perforated or not, or in a successive step, on the already-solid sheet, by applying conventional methods.

As already mentioned above, the thickness of the node elements in a direction which is transverse to the plane of arrangement of the sheet is greater than the thickness of the regions which will define the elongated portions; the configuration may be varied, and in particular the protruding part may be uniformly distributed on both faces of the sheet or protrude only on one side.

When the stretching is applied, as schematically indicated in FIGS. 3 to 5, which initially illustrate a node before the stretching is performed and the successive stretching steps, an orientation of the molecules is produced; said molecules are elongated in the stretch direction, and said orientation mainly affects the elongated portions 3, while the node elements 4 have a limited number of molecules which become orientated in the stretch direction; said molecules, however, remain in practice embedded in the unstretched and non-orientated molecules by virtue of the fact that the additional mass of polymer present in the node is not stretched.

The node elements consequently have non-orientated molecules and orientated molecules which are embedded in said non-orientated ones, and therefore act as such.

The net structure as shown in FIG. 6 obtained after stretching of the initial sheet of plastic material 1 therefore is seen to comprise a sheet made of plastic material having a plurality of holes 2 defined by a generally rectangular grid pattern of the elongated elements 3 and the transverse portions 6 interconnected by the node elements 4.

As previously mentioned, it is furthermore possible to subject the transverse portions 6 to a moderate stretching action, thus partially orientating the molecules in the transverse portions; this is a preferred configuration, since it imparts improved mechanical characteristics with respect to a product in which said transverse stretching is not performed As can be seen from FIGS. 6-8, the transverse portions 6 have a thickness perpendicular to the plane of lay of the net structure which is less than the thickness of the nodes 4.

A monostretched net according to the prior art and a monostretched net manufactured according to the above described concepts were used for experimental comparative tests.

High-density polyethylene was used, producing a net with a unit weight of 750 g per square meter, at a test temperature of 20° C.

The results reported in the following table were obtained by producing nets of equal weight and equal number of threads both longitudinally and transversely.

|  | Traction speed mm/min | Product according to the invention kg/thread | Product according to the prior art kg/thread |
| --- | --- | --- | --- |
| Longitudinal direction | 50 | 185,0 | 137,4 |
|  | 300 | 207,7 | 158,9 |
| Transverse direction | 50 | 67,0 | 53,5 |
|  | 300 | 94,2 | 76,8 |

In flexing tests with a 360° rotation, the net according to the present invention did not suffer any breakages, even when subjected to up to 100 continuous cycles, while the net according to the known art already suffered breakages from the very first flexings with flexing angles of 90°–120° and to further detriment the breakage consequent to the flexing propagated to the longitudinal thread, aggravating the damage due to the drastic reduction of the thread resistance.

Said reduction was predominantly caused by the fact that the flexings occurred in the thinner region, which comprised fibers orientated in the stretch direction and therefore scarcely adapted to withstand loads applied transversely to the direction of the fibers.

The net according to the present invention showed high resistance characteristics, since the flexing still localizes in the thinner region but said region is constituted by the transverse portions, where the fibers are either unstretched or are orientated to a limited extent in the direction which is perpendicular to the net main stretch direction, so that the fibers are arranged so that they advantageously withstand the flexing actions.

Figure 11:
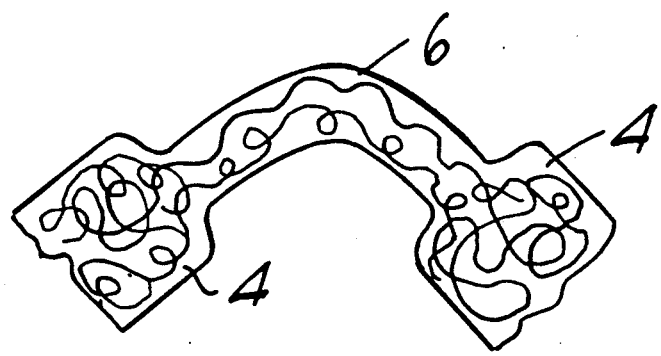
FIG. 11 is a schematic view of the arrangement of the molecules in the transverse portions subject to flexure, with a torque having a direction parallel to the stretch direction.
Figure 12:
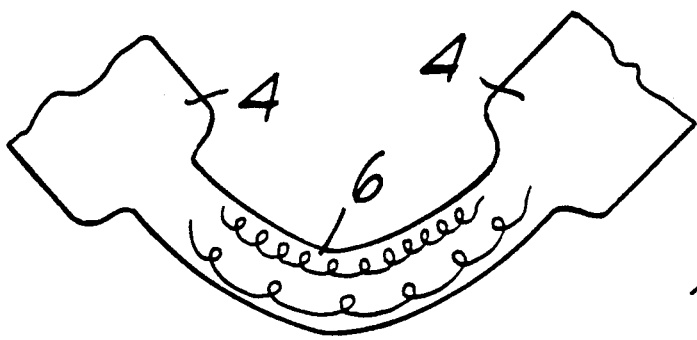
FIGS. 12 and 13 are schematic views of the arrangement of the molecules in the elongated portions subject to bending stress.
Figure 13:
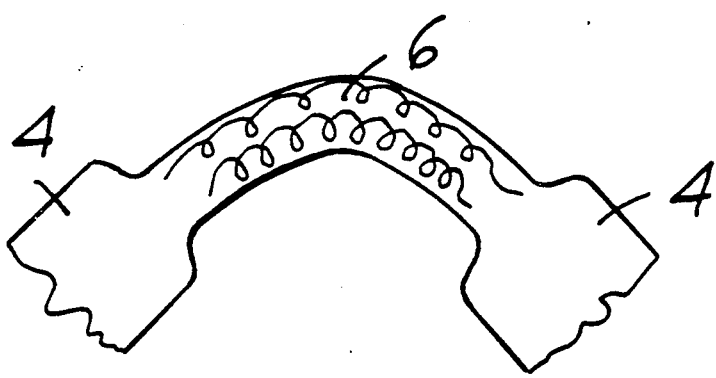

As is schematically illustrated in FIGS. 11 to 13, if the transverse portions are flexed the fibers which are even moderately orientated act in practice as springs and allow the flexure without causing breakages.

The fact is furthermore stressed that in the node regions the net according to the invention has a high number of non-orientated fibers which in practice constitute an interruption point stopping propagation of breakages which might form on the elongated threads or portions consequent to stresses perpendicular to the direction of orientation of the molecules.

FIGS. 14 and 15 schematically illustrate that a stress F normal to the direction of orientation of the threads and arranged on the plane of said net acts as a separating force for the molecules in the region of the thread or elongated portion which is stretched and aligned. In this area the fibers are joined by weak intramolecular chemical-physical bonds and by a small number of true chemical links, and it is consequently relatively easy for the molecules to separate, causing cracks which easily tend to propagate, as illustrated in FIG. 15.

However, the node with non-orientated molecules acts as interrupting element.

Comparative tests on two nets of equal weight, obtained respectively according to the invention and according to the prior art, show that with a 750 g/m2 net, at a speed of 50 mm/min and at a temperature of 20° C. the maximum load applied to the node of the net according to the invention was 34.8 kg/node, while with the net according to the prior art the maximum load was 29.3 kg/node; in practice a significant increase in the resistance at the node has also been achieved.

A further problem related to the use in heavy-duty conditions arises from impact resistance.

As is known, impact resistance is analyzed according to standard tests, for example according to the ASTM D-256-test; according to this test, employing the Charpy method a specimen of appropriate dimensions is locked at its ends by two clamps, and a weight (pendulum) is launched at a preset speed so that it strikes the specimen exactly at the center between the two clamps. The mass, colliding with the specimen, causes it to break.

The breakage therefore occurs at the expense of the energy of said mass; if its residual energy is measured, an indication of the specimen behavior, i.e. of the energy which it absorbed in the impact, is consequently obtained; the higher the absorbed energy, the greater its resistance.

In practice, since this test is performed by involving high energies and very high speeds, it tends to occur in the range of brittle breakage, rather than in the range of ductile breakage, and is intended to simulate the real conditions arising from stresses to which many materials are subject in their practical use, such as violent impacts and the like.

Once they have been subject to tests according to this method, which was appropriately modified since nets, not standard specimens, were tested, the following results were obtained:

|  | Net according to the prior art | Net according to present invention |
| --- | --- | --- |
| Longitudinal threads | 1,396 Kg.m | 3,960 Kg.m |
| Transverse threads | 1,316 Kg.m | 1,676 Kg.m |

The point of impact was always at the center of the node element, since this is the region which had to be tested to verify, even with this kind of impact, the advantages arising from the net according to the invention, which has nodes of increased thickness with respect to the remaining parts.

From the result of the test it can be seen that the energy absorbed in the impact by the product manufactured according to the invention is significantly higher; this means that the use of the net is safer and its field of application is wider.

The net according to the invention can in fact, for example, be used at lower temperatures than known ones; in fact it is known that low temperatures increase brittleness; a product which is already brittle at room temperature is therefore at the limit of its application around this temperature.

A product manufactured according to the invention is less brittle or indeed partially ductile at room temperature, as has been verified by performing the above described tests, and can therefore operate in a much wider range of application and can be used at temperatures even below zero without the risk that impacts with a low energy content may cause its brittle breakage.

To summarize, the sheet-like element according to the invention therefore has considerable practical advantages which predominantly arise from the fact of starting from an initial sheet-like element in which node elements are provided between the holes and have increased thickness so that when the product is completely manufactured, i.e. when the net is monostretched, there is an excess of material at the node which allows first of all to have at least a predominant portion of the molecules not orientated in the stretch direction and furthermore allows it not to suffer flexing damage, since a flexing action exerted transversely to the net causes bending in the reduced-thickness regions, which are constituted by the transverse portions where the molecules are either not orientated or are pre-orientated in a direction which is substantially perpendicular to the stretch direction of the elongated portions.

The size ratio between the thickness of the elongated portions and the thickness of the transverse portions is not critical, and may be changed according to the characteristics of use, without altering the characteristic that the thickness of the elongated portions and the thickness of the transverse portions must be in any case lower than the useful thickness provided in the node elements; in particular, when the product is finished, it is optimum to keep the ratio between the thickness of the node and the thickness of the elongated portions comprised between 1.1 and 15.

From what has been described above it can thus be seen that the invention achieves the proposed aim and objects and in particular the fact is stressed that a monostretched net is provided which has considerably increased breaking-resistance characteristics with respect to the nets of the prior art manufactured with the same material and the same amount of material per square meter.

The invention thus conceived is susceptible to numerous modifications and variations, all of which are within the scope of the inventive concept.

All the details may furthermore be replaced with other technically equivalent elements.

I claim:

1. Plastic material net structure, comprising a sheet made of plastic material having a plurality of holes defined by a generally rectangular grid pattern of elongated portions and transverse portions interconnected by node elements, said sheet defining a plane of lay, said elongated portions extending in a stretch direction and being substantially orientated, said transverse portions extending substantially perpendicular to the stretch direction and being substantially non-orientated, said transverse portions defining a transverse portion thickness perpendicular to said plane of lay and said node elements defining a node element thickness perpendicular to said plane of lay, said transverse portion thickness being less than said node element thickness.

2. Plastic material net structure, comprising a sheet made of plastic material having a plurality of holes defined by a generally rectangular grid pattern of elongated portions and transverse portions interconnected by node elements, said sheet defining a plane of lay, said elongated portions extending in a stretch direction and being substantially orientated, said transverse portions extending substantially perpendicular to the stretch direction and being substantially non-orientated, said transverse portions defining a transverse portion thickness perpendicular to said plane of lay and said node elements defining a node element thickness perpendicular to said plane of lay, said transverse portion thickness being less than said node element thickness, said transverse portions being pre-stretched transverse portions with a pre-stretch ratio comprised between 1:1 and 2.5:1.

3. Plastic material net structure, comprising a sheet made of plastic material having a plurality of holes defined by a generally rectangular grid pattern of elongated portions and transverse portions interconnected by node elements, said sheet defining a plane of lay, said elongated portions extending in a stretch direction and being substantially orientated, said transverse portions extending substantially perpendicular to the stretch direction and being substantially non-orientated, said transverse portions defining a transverse portion thickness perpendicular to said plane of lay and said node elements defining a node element thickness perpendicular to said plane of lay, said transverse portion thickness being less than said node element thickness, said node elements being substantially non-orientated.

4. Net structure according to claim 3, wherein said node elements have protrusions which protrude from a single face of said sheet.

5. Net structure according to claim 3, wherein said node elements have protrusions which protrude from both faces of said sheet.

* * * * *